(12) United States Patent
Devos et al.

(10) Patent No.: US 7,042,640 B2
(45) Date of Patent: May 9, 2006

(54) PROJECTION SCREEN UNIT WITH PROJECTION SURFACES OPTIMIZED FOR DIFFERENT AMBIENT LIGHT LEVELS

(75) Inventors: John A. Devos, Corvallis, OR (US); Gregory J. May, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/863,454

(22) Filed: Jun. 8, 2004

(65) Prior Publication Data

US 2005/0270644 A1    Dec. 8, 2005

(51) Int. Cl.
   *G03B 21/56* (2006.01)
(52) U.S. Cl. ............... 359/443; 359/446; 359/461
(58) Field of Classification Search ........... 359/443, 359/461, 446; 160/5, 243, 312; 396/3
   See application file for complete search history.

(56) References Cited

U.S. PATENT DOCUMENTS

| | | | | |
|---|---|---|---|---|
| 1,027,371 A | * | 5/1912 | Bates et al. | 359/461 |
| 3,128,688 A | * | 4/1964 | Coda | 396/3 |
| 5,353,152 A | * | 10/1994 | Realmuto | 359/461 |
| 5,434,631 A | | 7/1995 | Lieberman et al. | |
| 6,424,463 B1 | * | 7/2002 | Nishitani | 359/449 |
| 6,427,389 B1 | | 8/2002 | Branc et al. | |
| 6,547,396 B1 | | 4/2003 | Svardal et al. | |
| 6,839,168 B1 | * | 1/2005 | Kobayashi | 359/446 |
| 6,853,486 B1 | * | 2/2005 | Cruz-Uribe et al. | 359/443 |
| 2002/0124479 A1 | | 9/2002 | Branc et al. | |
| 2003/0214632 A1 | | 11/2003 | Ma et al. | |
| 2003/0214640 A1 | | 11/2003 | Kimura et al. | |
| 2004/0212879 A1 | * | 10/2004 | Imade | 359/451 |

* cited by examiner

*Primary Examiner*—Christopher Mahoney

(57) ABSTRACT

A projection screen unit includes a first projection surface optimized for a predetermined range of ambient conditions and a second projection surface optimized for a second, different range of ambient conditions.

38 Claims, 9 Drawing Sheets

PROJECTION SCREEN UNIT WITH PROJECTION SURFACES OPTIMIZED FOR DIFFERENT AMBIENT LIGHT LEVELS

BACKGROUND

Image projection is used in a variety of different applications. For example, electronic slide shows and presentations are frequently projected onto a wall or screen for viewing by a relatively large audience. Additionally, many television and home entertainment systems use an image projected onto a wall or screen to provide a much larger image than is readily available using a monitor or cathode ray tube. Another known example of image projection is the movie theater, which typically uses image projection to show movies to a large audience.

While image projection provides a large, quality image, the visibility of projected images can be greatly impacted by the amount of ambient light in the room or area where the image is projected. Generally, a projected image is easier to see in low ambient light and more difficult to see in relatively bright ambient light.

However, the surface onto which the image is projected also has an impact on how visible the image is in different amounts of ambient light. For example, some projection surfaces make the projected image somewhat easier to see despite relatively bright ambient light. Other projection surfaces may enhance the visibility and quality of the projected image in a relatively low level of ambient light.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

As will be described in detail below, a projection screen can include two or more projection surfaces. The various projection surfaces of the screen are optimized for different levels of ambient light. For example, one side of the screen or one projection surface may be optimized to display an image in relatively bright ambient light, while another side or projection surface of the screen may be optimized to display an image in relatively low ambient light. In this way, a user can have the advantage of a projection surface optimized for two or more different ambient light levels without having to store and use a corresponding number of different screen units.

As used herein and in the appended claims, a "projection surface" is any surface onto which a projector projects an image. In some examples, a projection surface may be all or a portion of a projection screen. However, a projection surface need not be part of a projection screen. A projection surface is generally a passive surface, meaning that it requires no power and passively reflects a projected image to a viewer. However, a projection surface, as defined herein, could include powered or active screens.

As used herein and in the appended claims, a "projection screen" or "screen" will be understood as a unit specifically designed to incorporate a projection surface. A projection screen may be, for example, portable or built in to a ceiling, wall or piece of furniture.

As used herein and in the appended claims, an "image" projected by a projector onto a projection surface will be understood to refer broadly to any type of image that may be projected. For example, a projected image may be a still picture, a series of still pictures or slide show, a motion picture or movie, etc.

As used herein and in the appended claims, "ambient conditions" are any conditions that affect the viewer's response to the projected image. For example, ambient conditions include ambient light level, ambient light direction, ambient light color composition, the number and arrangement of ambient light sources, etc. Ambient conditions also include such factors as viewer preferences, color temperature of the screen (a blue white versus a warmer white, etc.

Figure 1:
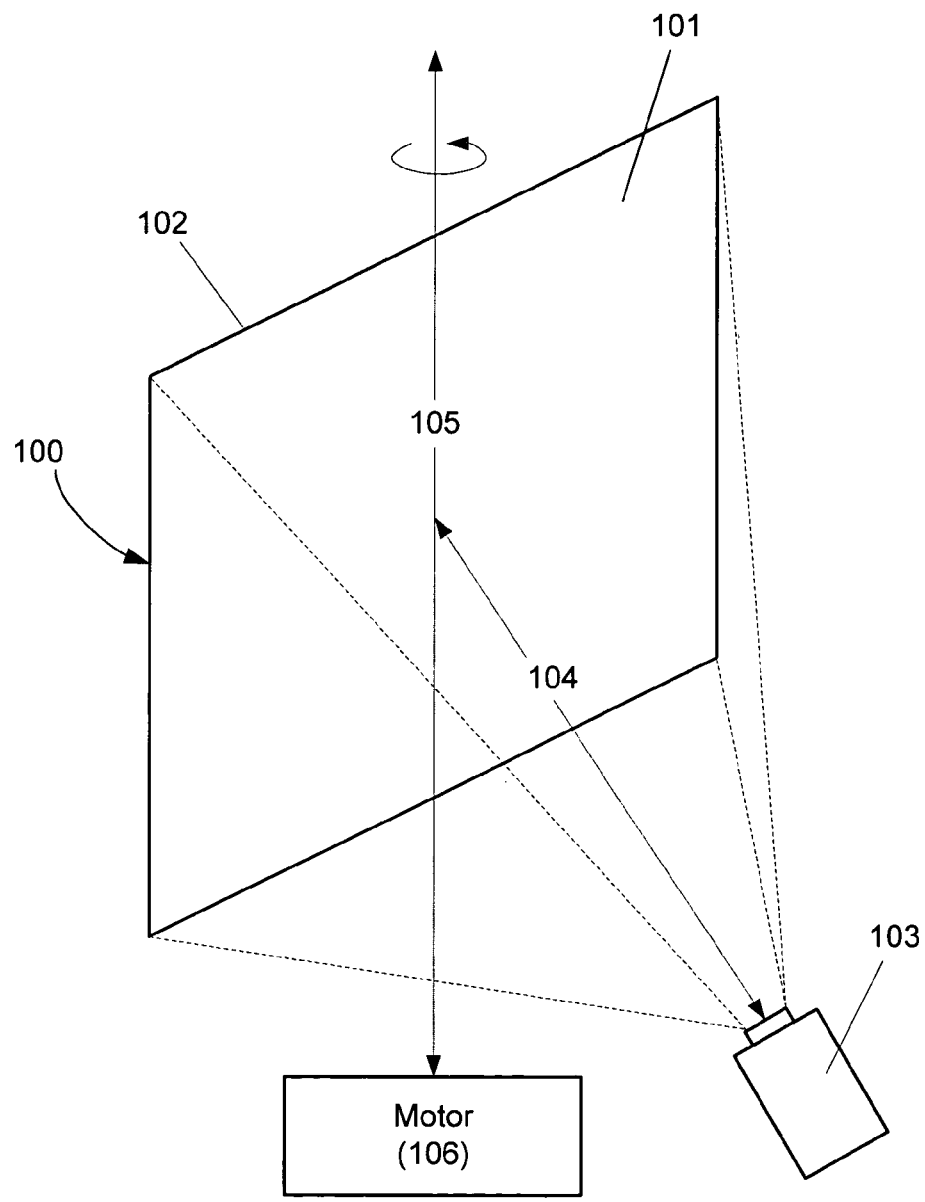
FIG. 1 illustrates a projector and two-sided projection screen according to one embodiment described herein.

FIG. 1 illustrates a projector and a two-sided projection screen according to one embodiment described herein. As shown in FIG. 1, a projector (103) is used to project an image onto a projection screen (100). Any image may be projected onto the screen (100), for example, a still picture, slide show, motion picture, etc.

The screen (100) has a first or front side (101) and a second or rear side (102). Either or both of these two sides (101, 102) can be used as a projection surface on which an image is projected by the projector (103).

These two sides (101, 102) have different properties. For example, the first or front side (101) is optimized for displaying a projected image in relatively bright ambient light, while the back side (102) is optimized for dark room environments.

This may be accomplished in some embodiments by providing a material on the front side (101) of the screen (100) that rejects, e.g., absorbs or scatters, ambient light to reduce the effect of the ambient light on the projected image. For example, the front side (101) of the screen (100) may have reflective particles to aid in ambient filtering to reject ambient light and improve the image.

A line (104) normal to the front side (101) of the screen defines an axis. Light from the projector (103) will arrive at the screen within a limited angular range with respect to the axis (104). Consequently, the front side (101) of the screen (100) can be configured to reject ambient light arriving at a significant angle to the axis (104) or at more than a predetermined angle with respect to the axis (104).

In contrast, the rear or second side (102) of the screen (100) is optimized for displaying a projected image in relatively low ambient light, for example, in a darkened room. As such, the rear side (102) has substantially less need to reject ambient light. In some embodiments, the rear side (102) can achieve a high contrast ratio with a white surface that may include reflective material to reflect projected light that is substantially on-axis (104).

Consequently, the user can use either the front side (101) or the rear side (102) of the screen (100) depending on the level of ambient light. Thus, regardless of whether the level of ambient light is relatively high or low, the user can have a projection surface optimized for that relative level of ambient light. The user does not need to have, store and use two or more screen units to achieve optimal projection viewing in varying levels of ambient light.

The user can manually select the side (101 or 102) of the screen (101) that is used as the projection surface by rotating the screen (101) about its vertical axis (105). Alternatively, a motor (106) may be provided to rotate the screen (101) about the vertical axis (105) to selectively present either side (101 or 102) to the projector (103).

As will be described in more detail below, the motor (106) can be operated with user controls, including for example, a remote control unit. The motor (106) may also be operated automatically by a light detector that senses the level of ambient light and determines which side (101 or 102) of the screen (100) would be the optimal projection surface in that level of ambient light.

Figure 2:
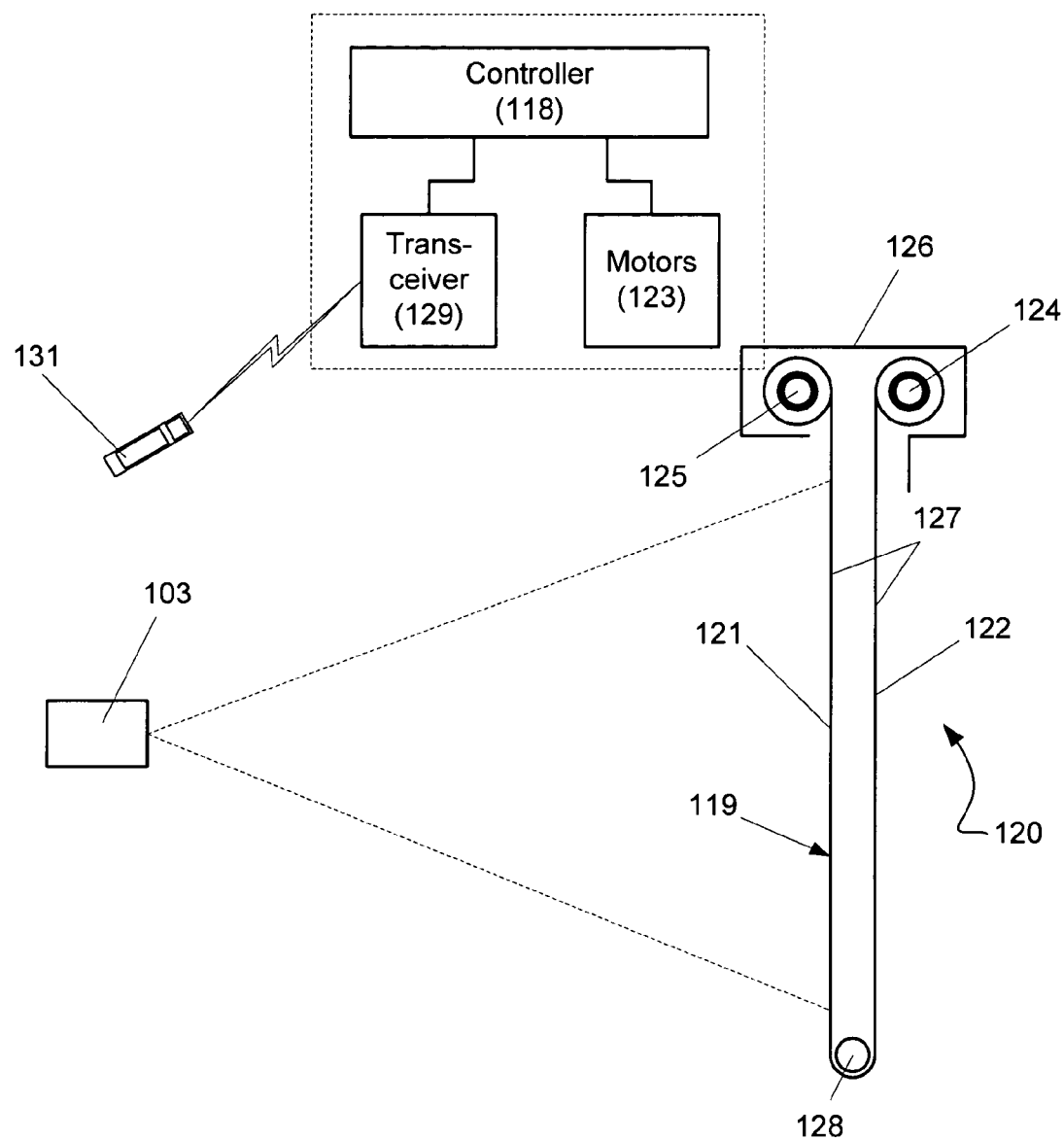
FIG. 2 illustrates a projection system with projection surfaces optimized for different ambient light conditions according to another embodiment described herein.

FIG. 2 illustrates a projection screen unit according to another embodiment described herein in which two or more projection surfaces are optimized for different amounts of ambient light or different ambient light conditions such has directionality and color content. As shown in FIG. 2, a projector (103) is again used to project an image onto the projection surfaces of the projection screen unit (120). The projection screen unit (120) includes at least two different projection surfaces (121, 122) that are each optimized for different levels, directionality, or color content of ambient light, similar to the sides of the screen (100) described above with reference to FIG. 1. Additionally or alternatively, the two projection surfaces (121, 122) may be different shapes.

As shown in FIG. 2, the screen unit (120) includes an elongated, flexible screen (119) that is disposed in a loop (127). A weighted hanging roller (128) is supported in the bottom of the loop (127) and helps maintain the sides of the loop (127) in a straight, vertical position. This allows whichever projection surface (121, 122) is presented to the projector (103) to remain in a flat and vertical orientation to provide a good projection surface for the projector (103).

Each end of the screen (119) is wrapped around a respective roller (124, 125). The rollers (124, 125) may be contained in a housing (126). The operation of the rollers (124, 125) will be described in more detail below.

The unit (120) can also have screen horizontal tensioning and other devices to ensure a flat projection surface. These devices may include guides on the rollers (124, 125) such as an outward taper at each end of each roller. The unit (120) may also include tension wires (132, FIG. 3) running between the housing (126) and the weighted hanging roller (128). The unit (120) may also include a roller that expands horizontally upon electronic actuation when the screen is fully extended. The unit (120) may also have frictional material on the weighted hanging roller (128) to ensure a "clean pull" on the bottom on the screen loop (127).

As shown in FIG. 2, the screen (119) includes two or more projection surfaces (121, 122) that are disposed along the length of the screen (119). As indicated, the projection surfaces (121, 122) are each optimized for different levels of ambient light, similar to the front side (101) and rear side (102) of the screen (100) described above with reference to FIG. 1.

As will be described in more detail below with reference to FIGS. 3–5, the rollers (124, 125) can be driven forward and backward to change the projection surface (121, 122) that is presented to, or facing, the projector (103). For example, as the first projection surface (121) is wound around the left roller (125), the second projection surface (122) moves around the hanging roller (128) and is presented to the projector (103). Similarly, if the second projection surface is wound toward or around the right roller (124), the first projection surface (121) is presented to the projector (103), as is illustrated in FIG. 2.

Within the housing (126) or adjacent to the housing (126) are the bi-directional motors (123) that individually drive the rollers (124, 125) in either a forward or reverse direction. Thus, either roller (124, 125) can be driven to wind or unwind a portion of the screen (119).

In the embodiment shown in FIG. 2, the motors (123) can be selectively operated by the user. For example, a remote control unit (131) is used to signal a motor controller (118). A transceiver (129) with the controller (118) receives the signal from the remote control unit (131) and relays that signal to the controller (118).

The user can decide, based on the ambient light level, which projection surface (121, 122) will provide optimal projection viewing under the circumstances. For example, if the ambient light level is relatively high, using the remote control unit (131), the user can signal the motors (123) to drive the rollers (124, 125) to present the first projection surface (121) to the projector. Alternatively, if the ambient light level is relatively low, the user, using the remote control unit (131), can signal the motors (123) to drive the rollers (124, 125) so as to present the second projection surface (122) to the projector (103). This is illustrated in FIG. 3.

Figure 3:
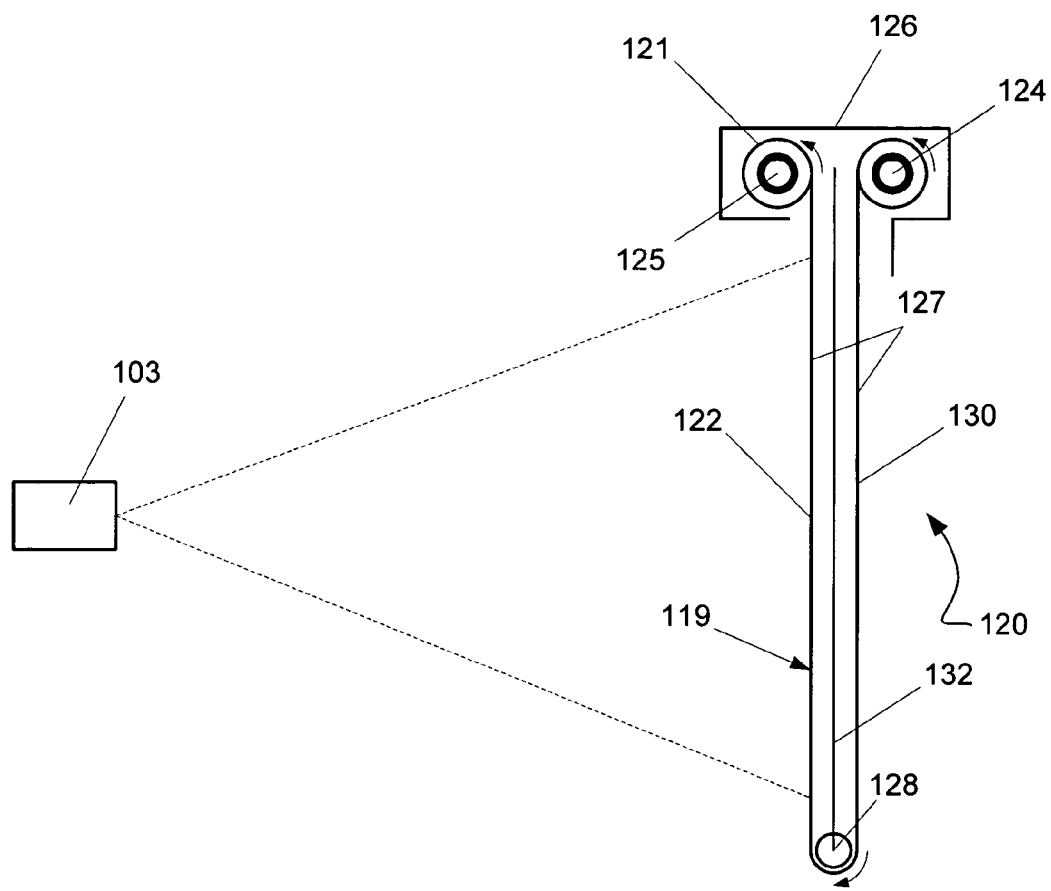
FIG. 3 illustrates operation of the system illustrated in FIG. 2.

As shown in FIG. 3, both of the rollers (124, 125) are driven in a counter-clockwise direction by the motors (123, FIG. 2). Consequently, the first projection surface portion (121) of the screen (119) is wrapped around the left roller (125) and the second projection surface (122) is pulled into a position in front of the projector (103). A trailer portion (130) of the screen (119) is also pulled from the right roller (124) as the second projection surface (122) is presented to the projector (103).

To return to the first projection surface (121), the rollers (124, 125) are driven in the opposite direction, clockwise. This pulls the second projection surface (122) toward the right roller (124) and unwinds the first projection surface (121) from the left roller (125) to a position in front of the projector (103).

When the projection screen unit (120) shown in FIGS. 2 and 3 is not in use, it can be retracted into the housing (126). The process of retracting the screen is illustrated in FIG. 4.

Figure 4:
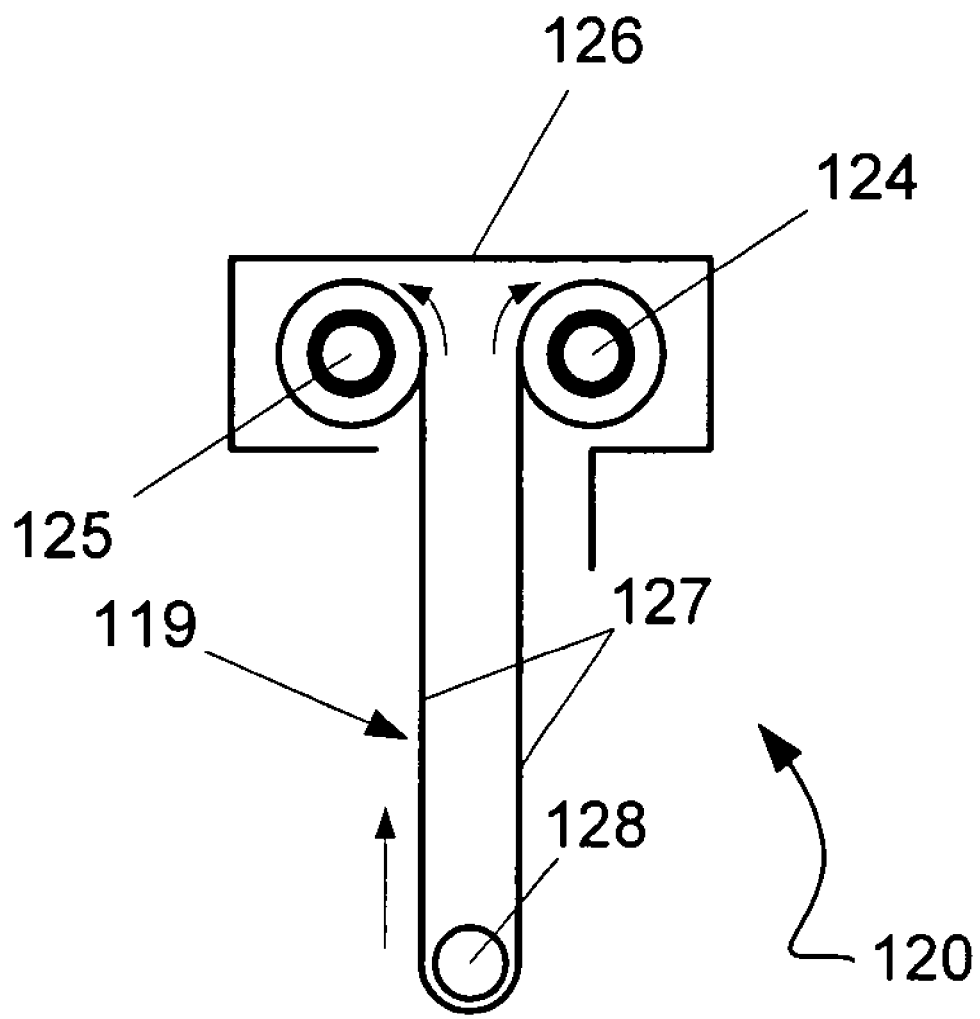
FIG. 4 illustrates operation of the system illustrated in FIG. 2 to retract the screen.

As shown in FIG. 4, the two rollers (124, 125) are driven in opposite directions. For example, the left roller (125) is driven in a counter-clockwise direction so as to wind a portion of the screen (119) on the left roller (125). Similarly, the right roller (124) is driven in a clockwise direction so as to wind a portion of the screen (119) on the right roller (124).

In this way, the screen (119) is almost entirely wound on the two rollers (124, 125) and is, therefore, in a retracted position convenient for storage when the unit is not in use. As the screen (119) is retracted, the hanging roller (128) is drawn upward as the loop (127) of the screen (119) shrinks.

When the unit (120) is again to be used, the rollers (124, 125) are again driven in opposite directions. For example, the left roller (125) is driven in a clockwise direction so as to unwind the portion of the screen (119) wound on the left roller (125). Similarly, the right roller (124) is driven in a counter-clockwise direction so as to unwind the portion of the screen (119) wound on the right roller (124).

As the rollers are so driven, the loop (127) of the screen (119) increased. The hanging roller (128) is accordingly lowered and provides a downward force that helps to extend the loop (127) while keeping the sides of the loop in a flat, vertical orientation. This continues until the screen (119) is extended, as shown in FIG. 2, and ready to receive an image from the projector (103).

Figure 5:
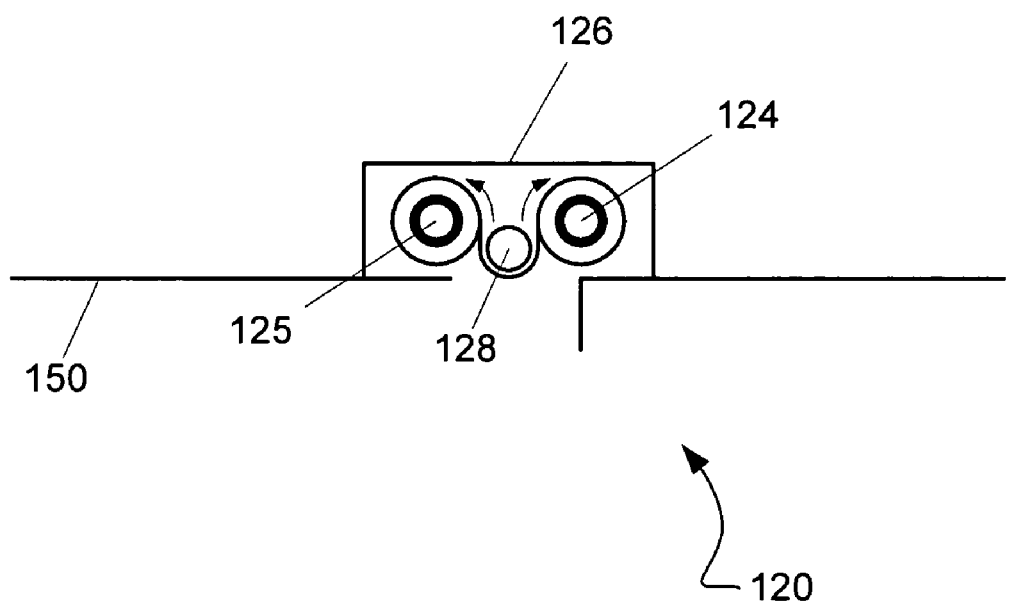
FIG. 5 illustrates the system of FIG. 2 with the screen in a fully retracted position.

FIG. 5 illustrates the system of FIG. 2 with the screen in a fully retracted position. As shown in FIG. 5, the hanging roller (128) can be received, at least partially, within the housing (126) for convenient storage of the unit (120).

Also as shown in FIG. 5, the housing (126) may be mounted in and above the ceiling (150) of a room. In this way, the unit (120) is substantially hidden and unobtrusive when not is use. In alternative embodiments, the unit (120) can be mounted on the ceiling, to a wall or in a piece of furniture.

Figure 6:
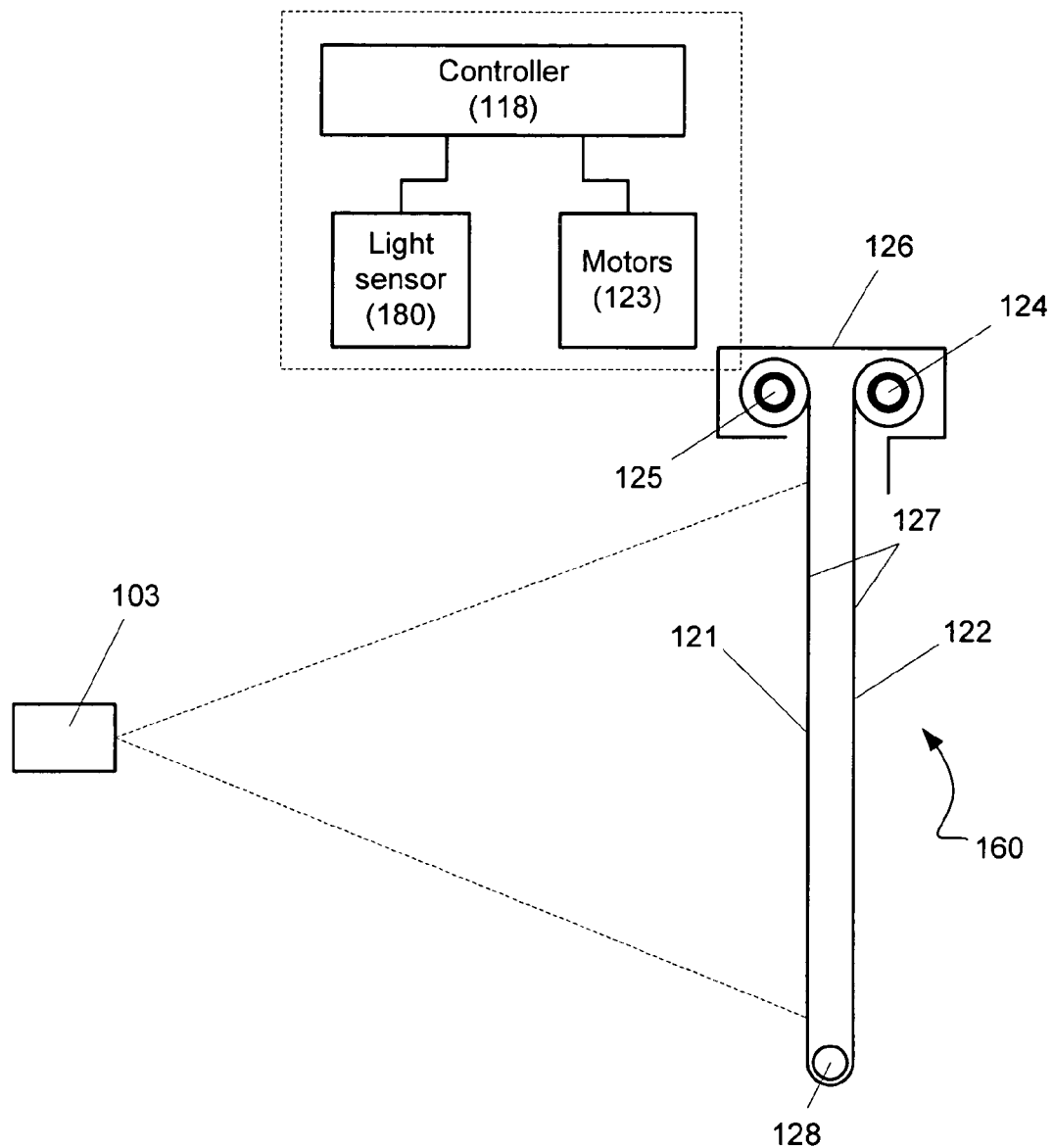
FIG. 6 illustrates a projection system with projection surfaces optimized for different ambient light conditions, where the proper projection surface is selected automatically, according to another embodiment described herein.

FIG. 6 illustrates a projection system with projection surfaces optimized for different ambient light conditions, where the optimal projection surface is selected automatically. In the example shown in FIG. 6, the motor controller (118) is connected to a light sensor (180). The light sensor (180) will detect the level of ambient light where the unit (160) is located. An indication of the level of ambient light is then output by the light sensor (180) to the controller (118).

The controller (118) will receive this data indicating the level of ambient light and select a projection surface (121, 122) that is optimized for that level of ambient light. For example, if the ambient light level is relatively high as detected by the light sensor (160), the controller (118) will control the motors (123) to drive the rollers (124, 125) so as to present the first projection surface (121) to the projector (103). Alternatively, if the ambient light level is relatively low as detected by the light sensor (160), the controller (118) will control the motors (123) to drive the rollers (124, 125) so as to present the second projection surface (122) to the projector (103). In this way, the optimal projection surface is automatically selected and presented to the projector (103).

In some embodiments, both the light sensor (160) and the remote control (131, FIG. 2) and transceiver (129, FIG. 2) may be included so that the user can either manually selected the desired projection surface or allow the unit to automatically select the optimal projection surface based on the output of the light sensor (160). Additionally, more than two projection surfaces may be included on the screen, each optimized for a different range of ambient light levels or a different type of image projection. In such a case, the desired projection surface can be selected manually, using a user input device such as the remote control (131, FIG. 2), or selected automatically based on the output of a light sensor (160) and/or other input parameters.

Figure 7:
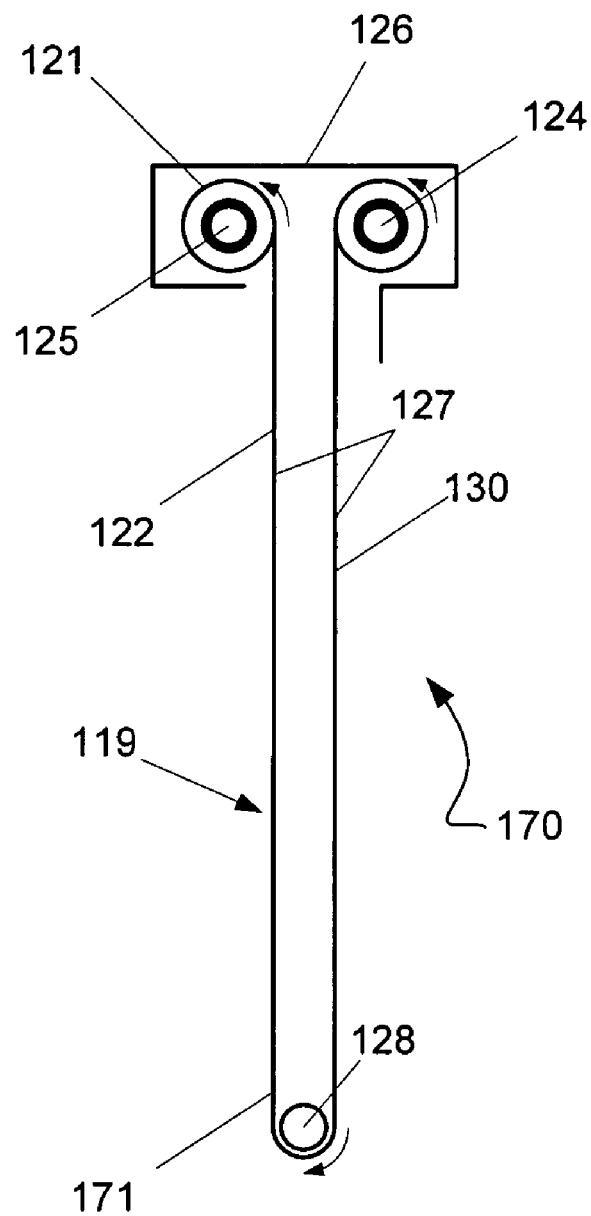
FIG. 7 illustrates a projection system with multiple projection surfaces optimized for different ambient light conditions according to another embodiment described herein.

FIG. 7 illustrates a projection system (170) with multiple projection surfaces optimized for different ambient light conditions according to another embodiment described herein. As shown in FIG. 7, there is a third projection surface (171) on the screen (119) between the second projection surface (122) and the trailer portion (130). The third projection surface (171) is presented to the projector by continuing to drive the rollers (124, 125) so as to wind the first projection surface (121) and the second projection surface (122) on the left roller (125).

As noted, the different screen segments or projection surfaces (121, 122, 171) are each optimized for a different level, directionality, or color content of ambient light or projection image type. For example, one of the three projection surfaces could be a high gain projection surface for use in relatively bright ambient light. Another of the surfaces could be a gray screen optimized for movies or motion pictures. The third surface could be a white screen providing sharper images in lower levels of ambient light. Any number of projection surfaces may be included in the screen roll, each optimized for different conditions.

In another alternative embodiment, each of the various projection surfaces in the unit could be on its own roll either looped or straight and weighted. Each projection surface could be driven by its own motor to lower or retract the surface or otherwise present the surface to the projector. A user input device could be used to allow the user to select the desired projection surface as in FIG. 5, the unit could select the optimal surface automatically as in FIG. 6, or both options could be available in the same unit.

Figure 8:
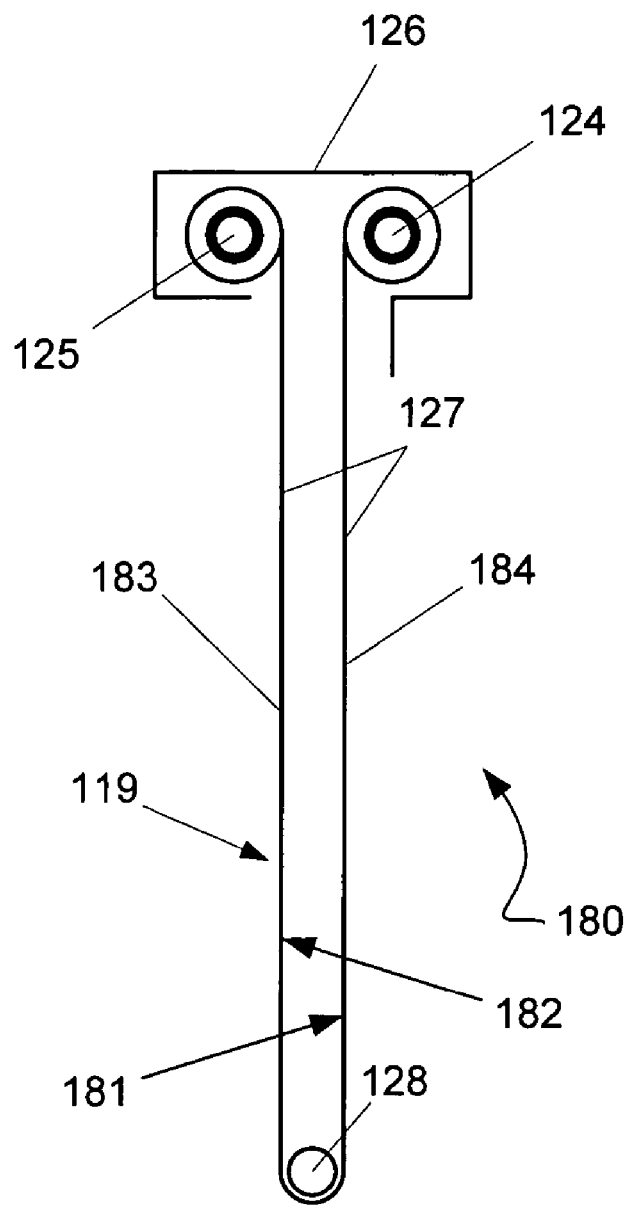
FIG. 8 illustrates another projection system with projection surfaces optimized for different ambient light conditions according to another embodiment described herein.

FIG. 8 illustrates another projection system with projection surfaces optimized for different ambient light conditions according to another embodiment described herein. As shown in FIG. 8, the unit (180) includes a projection surface (183) that is very thin to enhance brightness and resolution. Because the screen (119) is so thin over this projection surface (183), it is useful to back the screen with a white or silver reflector or reflective substance.

In some examples, this backing (182) can be provided directly on the back of the projection surface (183). In other example, because the screen (119) is looped (127), the backing (181) for the projection surface (183) can be provided on opposite side of the loop (127) as shown in FIG. 8. This backing (181) is disposed on a portion (184) of the screen roll (119) that can be a trailer portion or another projection surface. In some examples, the backing (181, 182) may be provided in both locations.

Figure 9:
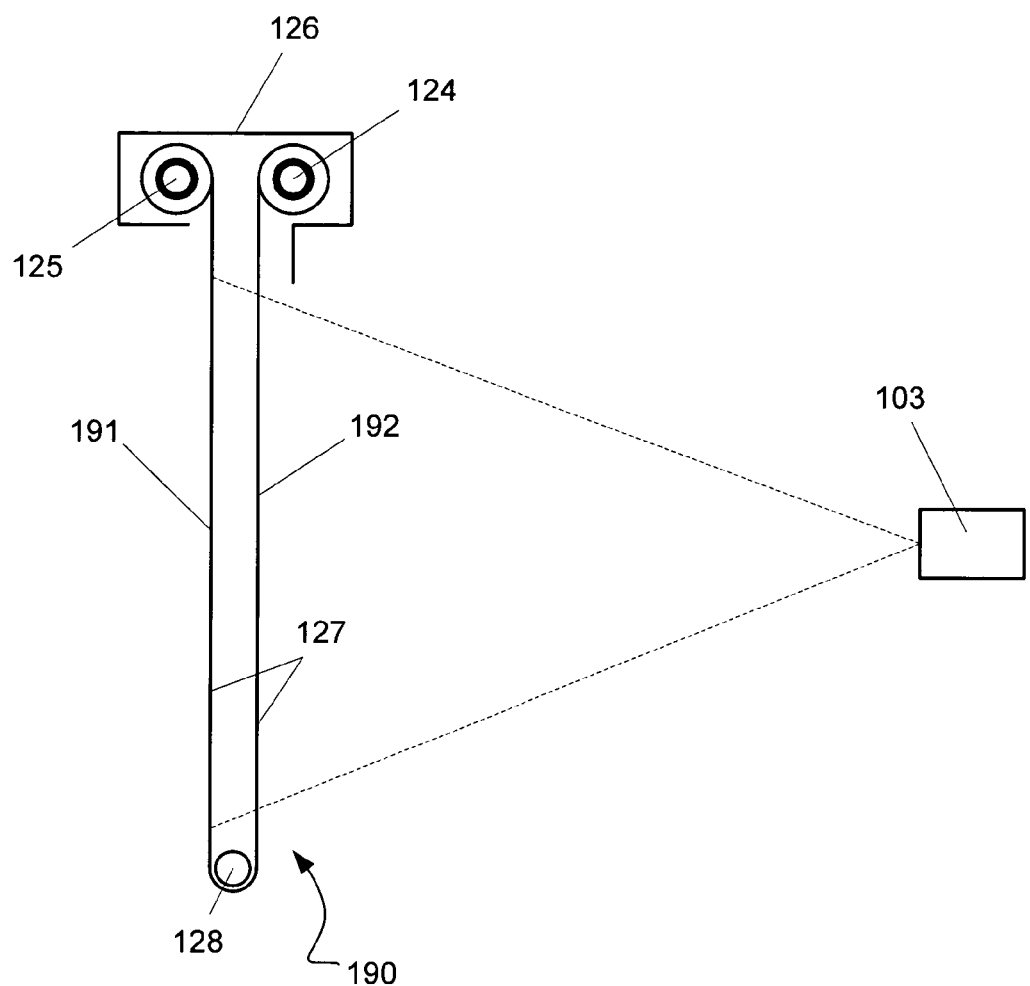
FIG. 9 illustrates another projection system with a rear projection surface incorporated into a roll of projection surfaces optimized for different ambient conditions.

FIG. 9 illustrates another projection system with a rear projection surface incorporated into a roll of projection surfaces optimized for different ambient conditions. As shown in FIG. 9, one or more of the projection surfaces (191) on the roll of the projection system (190) may be a rear projection surface, meaning that the projector (103) projects an image onto the rear of the projection surface (191), while a viewer watches the projected image from the other side of the projection surface (191), through the projection surface (191).

In such an embodiment, the opposite side (192) of the loop (127) may be transparent or comprise an opening through which the projector (103) projects an image on the rear side of the projection surface (191). As noted one or more rear projection surfaces may be placed on the roll of the system (190), with a corresponding transparent or open portion (e.g, 192) following each such rear projection surface. As in other embodiments, the various projection surfaces of the system (190) may be optimized for different ambient light conditions.

The preceding description has been presented only to illustrate and describe embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A projection screen unit comprising:
a first projection surface optimized for a predetermined range of ambient conditions; and
a second projection surface optimized for a second, different range of ambient conditions,
wherein said first and second projection surfaces are disposed one screen roll that is wound between two rollers.

2. The unit of claim 1, wherein said first projection surface is optimized for a predetermined range of ambient light levels and said second projection surface is optimized for a second different, range of ambient light levels.

3. The unit of claim 1, further comprising a weighting hanging roller held in a loop of said screen roll between said two rollers.

4. The unit of claim 1, further comprising motors for individually driving said two rollers to wind and unwind portions of said screen roll.

5. The unit of claim 4, further comprising a remote control unit for controlling said motors, wherein said motors present either said first projection surface or said second projection surface to a projector based on output from said remote control unit.

6. The unit of claim 4, further comprising a light sensor for sensing ambient conditions and controlling said motors to present either said first projection surface or said second projection surface to a projector based on said sensed ambient conditions.

7. The unit of claim 4, wherein said motors wind said screen roll on said rollers to place said unit in a storage position.

8. The unit of claim 1, further comprising a third projection surface disposed on said screen roll.

9. The unit of claim 1, further comprising a reflective backing for said first projection surface.

10. The unit of claim 9, wherein said reflective backing is disposed on said screen roll behind said second projection surface.

11. The unit of claim 1, wherein said first projection surface is a rear projection surface and said screen roll comprises a transparent or open portion for allowing projection to a rear side of said first projection surface.

12. The unit of claim 1, further comprising a tensioning device for keeping flat the projection surface being used.

13. The unit of claim 1, further comprising three or more projection surfaces.

14. The unit of claim 1, wherein said first and second projection surfaces are disposed on different portions of a single side of said screen roll.

15. A method of using a projection screen unit comprising multiple projection surfaces, said method comprising:
electronically determining ambient conditions; and
based on said determination of ambient conditions, selecting one of said multiple projection surfaces of said projection screen unit for use by a projector;
wherein said projection surfaces are disposed on different sides of screen and said method comprises rotating said screen to select a projection surface.

16. The method of claim 15, wherein said ambient conditions comprise ambient light level, ambient light directionality or ambient light color content.

17. The method of claim 15, wherein:
a first projection surface provides better projection viewing than a second projection surface in a first predetermined range of ambient conditions; and
said second projection surface provides better projection viewing that said first projection surface in a second, different range of ambient conditions.

18. The method of claim 15, wherein said step of determining ambient conditions is perform automatically with a light sensor, and said step of selecting a projection surface is performed automatically based on output from said light sensor.

19. The method of claim 15, wherein said selecting one of said multiple projection surfaces is performed automatically with a motor driving said projection screen unit.

20. A method of using a projection screen unit comprising multiple projection surfaces, said method comprising:
electronically determining ambient conditions; and
based on said determination of ambient conditions, selecting one of said multiple projection surfaces of said projection screen unit for use by a projector;
wherein said projection surfaces are disposed on a screen roll that is wound between two rollers and said method comprises individually driving said rollers to select a projection surface.

21. The method of claim 20, further comprising weighting a loop of said screen roll with a weighting hanging roller held in a loop of said screen roll between said two rollers.

22. The method of claim 20, further comprising controlling said rollers with a remote control unit.

23. The method of claim 20, further comprising winding substantially all of said screen roll onto said rollers to place said unit in a storage position.

24. A method of forming a projection screen unit comprising:
providing a first projection surface;
providing a second projection surface;
forming said first and second projection surfaces on different portions of a screen roll that is then wound between two rollers;
wherein:
said first projection surface provides better projection viewing than said second projection surface in a first predetermined range of ambient conditions; and
said second projection surface provides better projection viewing that said first projection surface in a second, different range of ambient conditions.

25. The method of claim 24, further comprising placing a weighting hanging roller in a loop of said screen roll between said two rollers.

26. The method of claim 24, further comprising providing motors for individually driving said two rollers to wind and unwind portions of said screen roll.

27. The method of claim 26, further comprising providing a remote control unit for controlling said motors, wherein said motors present either said first projection surface or said second projection surface to a projector based on output from said remote control unit.

28. The method of claim 26, further comprising providing a light sensor for sensing ambient conditions and controlling said motors to present either
said first projection surface or said second projection surface to a projector based on said ambient conditions.

29. The method of claim 24, further comprising forming a third projection surface on said screen roll.

30. The method of claim 24, further comprising providing a reflective backing for said first projection surface.

31. The method of claim 30, further comprising providing said reflective backing on said screen roll behind said second projection surface.

32. A projection screen unit comprising:
a first projection surface; and
a second projection surface;
wherein said first and second projection surfaces are disposed on a screen roll that is wound between two rollers; and
wherein,
said first projection surface provides better projection viewing than said second projection surface in a first predetermined range of ambient conditions; and
said second projection surface provides better projection viewing that said first projection surface in a second, different range of ambient conditions.

33. The unit of claim 32, further comprising a weighting hanging roller held in a loop of said screen roll between said two rollers.

34. The unit of claim 32, further comprising motors for individually driving said two rollers to wind and unwind portions of said screen roll.

35. The unit of claim 34, further comprising a remote control unit for controlling said motors, wherein said motors present either said first projection surface or said second projection surface to a projector based on output from said remote control unit.

36. The unit of claim 34, further comprising a light sensor for sensing ambient conditions and controlling said motors to present either said first projection surface or said second projection surface to a projector based on said sensed ambient conditions.

37. The unit of claim 32, further comprising a reflective backing for said first projection surface.

38. The unit of claim 37, wherein said reflective backing is disposed on said screen roll behind said second projection surface.

* * * * *